United States Patent
Rogmann et al.

(10) Patent No.: US 7,994,251 B2
(45) Date of Patent: Aug. 9, 2011

(54) SYSTEM FOR COATING FLOORS

(75) Inventors: Karl-Heinz Rogmann, Ratingen (DE); Ulrike Scheuvens, Erkrath (DE); Heiko Faubel, Wermelskirchen (DE); Michael Decker, Solingen (DE)

(73) Assignee: Ecolab USA Inc., St. Paul, MN (US)

( * ) Notice: Subject to any disclaimer, the term of this patent is extended or adjusted under 35 U.S.C. 154(b) by 961 days.

(21) Appl. No.: 11/467,202

(22) Filed: Aug. 25, 2006

(65) Prior Publication Data

US 2007/0004846 A1    Jan. 4, 2007

Related U.S. Application Data

(63) Continuation-in-part of application No. 10/451,466, filed as application No. PCT/EP01/14561 on Dec. 12, 2001, now Pat. No. 7,118,785.

(30) Foreign Application Priority Data

Dec. 21, 2000 (DE) .................................. 100 64 413

(51) Int. Cl.
*C08K 3/20* (2006.01)

(52) U.S. Cl. ......... 524/501; 524/430; 524/522; 524/566

(58) Field of Classification Search ........... 524/430, 524/522, 556, 501
See application file for complete search history.

(56) References Cited

U.S. PATENT DOCUMENTS

| 3,929,743 A | 12/1975 | Sramek |
| 5,676,741 A | 10/1997 | Gray et al. |
| 5,782,962 A | 7/1998 | Burke et al. |
| 5,783,303 A * | 7/1998 | Tsuei ............................ 428/354 |
| 2004/0054067 A1 | 3/2004 | Rogmann et al. |

FOREIGN PATENT DOCUMENTS

| DE | 3911808 | 10/1990 |
| JP | 2000136351 | 5/2000 |
| WO | WO98/27162 | 6/1998 |

OTHER PUBLICATIONS

Database WPI, Section Ch, Week 200034, Derwent Publications Ltd/, XP002195094 1 page.
Pflegemittel auf der Basis von Wachsen, Ottom Kuhneweg (1975), 1 page.

* cited by examiner

*Primary Examiner* — Thao T. Tran
(74) *Attorney, Agent, or Firm* — Merchant & Gould P.C.

(57) ABSTRACT

A coating system for floors, containing
  a) one or more agents in which, together or separately, a polymer or polymer/wax dispersion and aziridine and, where desired, a flatting component are present, for application on the floor in order to form a crosslinked base film that is not capable of being removed by wet chemical means, as well as
  b) an aziridine-free agent containing conventional floor-maintenance components, in particular a polymer or polymer/wax dispersion, for the purpose of generating a sacrificial film on said base film that is capable of being removed by wet chemical means.

9 Claims, No Drawings

SYSTEM FOR COATING FLOORS

CROSS REFERENCE TO RELATED APPLICATION

This application is a continuation-in-part of U.S. patent application Ser. No. 10/451,466, filed Oct. 14, 2003, the complete disclosure of which is incorporated herein by reference in its entirety.

FIELD OF THE INVENTION

The present invention is concerned with coating systems for floors which, despite regular cleaning and/or disinfection with agents that contain antimicrobial components, do not turn yellow or become discolored or only undergo such discoloration to a slight extent.

BACKGROUND OF THE INVENTION

A person skilled in the art generally understands the expression 'polymer-based floor-maintenance agents' to mean, as a rule, classical maintenance agents which are capable of being removed by wet-chemical treatment. These removable maintenance agents are susceptible to disinfectants, particularly those based on alkylamines, quaternary ammonium compounds, alcohols, but also others, and no longer meet the more stringent demands of consumers. In particular, stains caused by skin disinfectants and hand disinfectants, as well as white stains caused by alcohol/water and colored stains caused by marker substances as well as instances of yellowing caused by surface disinfectants based, for example, on quaternary ammonium compounds and also on amine-type active substances continue to lead to complaints from the persons responsible for buildings, by reason of the visual impairments. These problems are observed, above all, in hospitals. But they also occur in attenuated form in an environment where use is made of cleaning agents and/or disinfecting agents that contain the indicated components.

By reason of the disadvantages of classical removable maintenance agents, in recent years it has been observed with increasing frequency that polyacrylates coupled to non-metals are being used in coating films, with the consequence that the resulting maintenance films are difficult to remove by wet chemical means or can no longer be removed by such means. "Wet chemical means" refers to a traditional floor stripper designed to remove traditional zinc or metal crosslinked acrylic finishes. Examples of traditional strippers include BLAST, CARESTRIP LO, BENDUROL FORTE, and HAWK from Ecolab Inc., and PROSTRIP by SC Johnson Professional Products. Such a floor stripper when used at the recommended use concentration is capable of removing a traditional zinc crosslinked topcoat but not able to remove a non-traditional crosslinked undercoat. Typically a more aggressive chemistry is needed to remove the cross-linked undercoat. Examples of such films are films that are crosslinked with aziridine and based on polyacrylate. Theoretically, these maintenance films would really never have to be removed if the effective film or films were always to be renewed early enough. But practice has shown that this is not actually put into effect or that the non-removable maintenance film is frequently damaged and thereafter has to be removed mechanically in elaborate manner by erosive means. A further consideration is that in the grinding process the control over the grinding action is also limited, and damage to the covering occurs quite often.

SUMMARY

Consequently the object of the present invention was to make available coating systems in which the outer layer is intended to serve, as it were, as a sacrificial layer and to be capable of being removed simply by wet chemical means, but in which, at the same time, the susceptibility of this simply removable sacrificial layer to discoloration with regard to antimicrobial components is to be minimal.

As is also evident from the examples section of the present invention, no maintenance films are known which are capable of being removed simply by wet chemical means and which, at the same time, display low susceptibility to discoloration in the sense of the present invention.

All the more surprising were the tests within the scope of the present invention, which showed that hardly any or no susceptibility to discoloration was present in respect of a coating system containing one or more base layers of a certain type that are not capable of being removed by wet chemical means and a maintenance layer or sacrificial layer applied thereon that is capable of being removed simply by wet chemical means and that, considered in itself, is susceptible to discoloration.

DETAILED DESCRIPTION OF SOME EMBODIMENTS

Accordingly, the present invention provides a coating system for floors, containing a) one or more agents in which, together or separately, a polymer or polymer/wax dispersion and aziridine and, where desired, a flatting component are present, for application on the floor in order to form a crosslinked base film that is not capable of being removed by wet chemical means, as well as b) an aziridine-free agent containing conventional floor-maintenance components, in particular a polymer or polymer/wax dispersion, for the purpose of generating a sacrificial film on said base film that is capable of being removed by wet chemical means.

In the system according to the invention, a) is preferably to be understood to comprise at least two agents, one of which contains the said aziridine and another of which contains the said polymer or polymer/wax dispersion.

In a particularly preferred embodiment of the system according to the invention, a) is even to be understood to comprise at least three agents, a first of which contains the said aziridine, a second of which contains the said polymer or polymer/wax dispersion and a third of which contains the said flatting component.

In some embodiments, a) and b) are identical compositions except that a) contains aziridine. In some embodiments, a) and b) are different compositions besides the addition of aziridine to a).

In accordance with the present invention, flatting components are preferably to be understood to be those which are selected from the large group comprising the compounds of silicic acid or polymer based materials. For a person skilled in the art, these compounds are those which, for example, are offered for sale by the companies Clariant, BYK CERA, Klein Additec. Additional flatting agents include the SYLOID C-SERIES silica gel flatting agents by Grace Davison, GASIL silica gels by INEOS, ACEMATT series by Degussa, and Lo-Vel flatting silicas from PPG Industries. The supplementary addition of the flatting component can be an advantage because stains in and on the maintenance film can be accentuated by gloss.

An attempt is often made to comply with the desire of consumers for less gloss by incorporating flatting agents. However, none of the products that contain flatting agents and that have been on the market hitherto is stable in storage. By reason of the low viscosity of the polymer dispersions, the flatting agents cream up, partly clot, or settle out on the floor. The products are predominantly offered for sale in 10-liter casks, so that sufficient homogenisation as a result of shaking of the cask does not take place.

In the service industry it is, moreover, not customary to employ stirrers for the purpose of homogenisation, as is customarily done by, for example, those responsible for laying floors and parquet flooring, where multi-component systems, also with flatting agents for example, are more frequently processed directly on site.

Therefore in the sense of the present invention it is an advantage to make the flatting component available, where desired, in the form of a separate agent and to use it only as needed.

In the system according to the invention the volumes of the casks in which the agents stated under a) have been decanted are preferably so chosen that when the complete contents of the casks are intermixed a mixture is present that exhibits precisely the ratio of the essential components for the system according to the invention that is desired for the formation of the base film or films.

In this connection it is particularly preferred if the volume of one of the stated casks, preferably that one in which the largest agent by volume is located, is so chosen that sufficient space is available to accommodate the contents of the additional stated cask or casks and to produce the desired mixture.

It is preferred, moreover, that in the system according to the invention at least two of the agents a) and/or b) contain conventional floor-maintenance components known to those skilled in the art selected from the group comprising waxes, surfactants, diluents, solvents, surface slip modifiers, defoamers, indicators, UV absorbers/light stabilizers/antioxidants, plasticizers, coalescents, adhesion promoters, preservatives/antimicrobial agents, levelling agents, thickeners, stability enhancers, dispersants, colorants, anti-settling agents, optical brighteners, alkali soluble resins, film-forming polymers and mixtures thereof, in which case, in particular, film-forming polymers are contained having a minimal film-forming temperature between 0 and 90° C.

Some non-limiting examples of suitable waxes include oxidized polyethylenes and polypropylenes and copolymers thereof.

Some non-limiting examples of surface slip modifiers include organic or inorganic particles incorporated in the finish itself to reduce slipping.

Some non-limiting examples of defoamers include silicon emulsions such as SE-21 from Wacker Silicons.

Some non-limiting examples of indicators include acid/base indicators, fluorescent indicators, redox indicators, metallochromic indicators, and photon sensitive dyes. Exemplary acid/base indicators include those color-changing indicators listed in Table 1 or 2 of the Merck Index (12$^{th}$ Edition, Budavari, O'Neil, Smith, Heckelman, Kinneary, eds., 1996, Merck Research Laboratories) or Table 8.23 in Lange's Handbook of Chemistry (15th Edition, Dean, J. A., 1999, McGraw-Hill, Inc.) or Table on pages 8-13 of CRC Handbook of Chemistry and Physics (72$^{nd}$ Edition, Lide, ed., 1991, CRC Press). The disclosures of acid/base indicators in these references are incorporated herein by reference. Exemplary acid/base indicators that may be used include methyl violet, bromophenol blue, tetrabromophenol blue, bromochlorophenol blue, Congo Red, alizarin sodium sulfonate, bromocresol green, chlorophenol red, bromocresol purple, bromophenol red, bromothymol blue, phenol red, rosolic acid, cresol red, tropeolin OOO, m-cresol purple, xylenol blue, alizarin yellow GG, alizarin yellow R, Nile Blue, tropeolin O, poirrier blue C4B, and indigo carmine. Other exemplary indicators that may change from colored to colorless include quinaldine red, 2,4-dinitrophenol (α-dinitrophenol), nitramine, 1,3,5-trinitrobenzene, 1,3,5-trinitrobenzene, and 2,4,6-trinitrophenol. Other exemplary acid/base indicators that may change from color to colorless in a pH range of 4 to 10.5 that may be used include 2,5-dinitrophenol (γ-dinitrophenol), p-nitrophenol, α-naptholphthalein, quinoline blue, ethyl bis[2,4-dinitrophenyl]acetate, o-cresolphthalein, phenolphthalein, thymolphthalein, and ethyl red. Exemplary fluorescent indicators that may be used include those listed in Table 8.25 in Lange's Handbook of Chemistry (15th edition, Dean, J. A., 1999, McGraw-Hill, Inc.) or on pages 8-15 of CRC Handbook of Chemistry and Physics (72nd edition, Lide, ed., 1991, CRC Press). The fluorescent indicators disclosed therein are incorporated herein by reference. Other exemplary fluorescent indicators that may be used include esculin, benzoflavine, 3,6-dioxyphthalimide, eosine YS, eosine BN, coumarin, Schaffer's salt, SS-acid (sodium salt), cotarnine, α-naphthionic acid, and anthranilic acid. Exemplary fluorescent indicators that change fluorescence over a pH range of 2 to 10 include chromotropic acid, 1-naphthoic acid, 1-naphthylamine-5-sulfonamide, Magdala Red, α-naphthylamine, β-naphththylamine, salicylic acid, 5-aminosalicylic acid, o-methoxybenzaldehyde, P-phenylenediamine, morin, 3,6-dioxyxanthone, β-methylesculetin, Neville-Winther acid, brilliant diazol yellow, magnesium 8-hydroxyquinolinate, β-methyumbelliferone, 1-naphthol-4-sulfonic acid and derivatives thereof, umbelliferone, β-naphthol, resorufin, and luminol. Exemplary fluorescent indicators also include those that fluoresce green, yellow, or orange and include fluorescein, fluorescein derivatives (such as erythrosin B (tetraiodofluorescein), phloxin BA extra (tetrachlorotetrabromofluorescein), eosin (tetrabromofluorescein), dichlorofluorescein, diodofluorescein, carboxy fluorescein, fluorescein isothiocyanate (FITC), tetrabromosulfonefluorescein), Cleves Acid, coumaric acid, 3,6-dioxyphthalic dinitrile, orcinaurine, patent phosphine, thioflavine, acridine orange and naphthazol derivatives. Exemplary redox indicators that may be used include those listed in Table 8.26 in Lange's Handbook of Chemistry (15th edition, Dean, J. A., 1999, McGraw-Hill, Inc.), the disclosure of which is incorporated herein by reference. Exemplary redox indicators that may be used also include 2-carboxydiphenylamine, o,m'-diphenylaminedicarboxylic acid, p-nitrodiphenylamine, benzidine dihydrochloride, o-toluidine, diphenylamine-4-sulfonate (Na salt), 3,3'-dimethoxybenzidine dihydrochloride, N,N-diphenylbenzidine, diphenylamine, N,N-dimethyl-p-phenylenediamine (Wurster's Reagent), variamine blue B hydrochloride, N-phenyl-1,2,4-benzenetriamine, 2,6-dichloroindophenol (Na salt), brilliant cresyl blue, 2,6-dibromophenolindophenol, starch, induline scarlet, neutral red, gallocyanine, indigo derivatives (indigao-5,5',7-trisulfonic acid (Na salt), indigo 5,5',7,7'tetrasulfonic acid (Na salt), Indigo 5,5'-disulfonic acid (Na salt), Indigo-5-monosulfonic acid)), phenosafranine, Nile blue A, thionine, methylene blue, methyl blue (acid blue 93). Exemplary metallochromic indicators include calmagite, eriochrome black T, murexide, PAN, pyrocatechol violet, salicylic acid, and xylenol orange. Exemplary photon sensitive dyes include BASF dyes, basonyl green, basonyl blue, pylam blue, traylmethanes, flexo yellow, diarylmethane, FD&C#2 indigotene, FD&C#2 lake, FD&C#1, FD&C#3 red, FD&C#3 green, triphenylmethanes, methyl blue, FD&C#1 lake, FD&C#5 yellow, pyrazoline, erythrosine lake, and FD&C#5 yellow lake.

Some non-limiting examples of UV absorbers, light stabilizers, or antioxidants include hindered amine types such as Tinuvin 123, Tinuvin 152, or Chimassorb 199, benzotriazole types such as Tinuvin 171, Tinuvin 384-2, or Tinuvin 1130, Tinuvin 400, Tinuvin 5050 or Irganox 1076, all available from Ciba Specialty Chemicals.

Some non-limiting examples of adhesion promoters include promoters based on silanes and silicones such as DYNASYLAN® from Degussa.

Some non-limiting examples of preservatives and antimicrobials include isothazoline derivatives such as Kathon CG-ICP (Rohm & Haas) and silver compounds or triclosan from Ciba.

Some non-limiting examples of wetting or levelling agents include fluorosurfactants such as Zonyl FSJ, FSN or FSO (Dupont), or MASURF FS-230 (Mason Chemical).

Some non-limiting examples of thickeners include polymeric thickeners from Rohm & Haas.

Some non-limiting examples of stability enhancers include anionic surfactants such as Abex 18S (Rhodia).

Some non-limiting examples of dispersants or anti-settling agents include fumed silicas; starch and modified starches; hydroxyethylcellulose (HEC) and functionalized copolymers such as alkali swellable emulsions (ASE), hydrophobically modified alkali swellable emulsions (HASE) and hydrophobically modified ethoxylated urethane resins (HEUR). Commercially available anti-settling agents that may be useful include the DREWTHIX™ series of rheology modifiers from Ashland Specialty Chemical Co.; the ANTISETTLE™ CVP, CRAYVALLAC™ series and FLOWTONE GST rheology modifiers from Atofina; the CAB-O-SIL™ series of fumed silicas from Cabot Corp.; the DISPEX™ series of dispersing agents and the VISCALEX™ and RHEOVIS™ series of rheology modifiers from Ciba Specialty Chemicals; the AEROSIL™ series of fumed silicas from Degussa; the UCAR™ POLYPHOBE™ series of alkali-swellable urethane-modified rheology modifiers from Dow Chemical Company; the AQUAFLOW™ series of nonionic and anionic associative polymers from Hercules Inc.; the NEOSIL™ series of fumed silicas from Ineos Silicas; the TAMOL™ series of polyacid and hydrophilic copolymer dispersants from Kia Inc.; the STRUCTURE™ series of modified starches from National Starch & Chemical; the CARBOPOL™ series of homopolymers and copolymers from Noveon and the ACRYSOL™, ACUSOL™ and ASE™ series of rheology modifiers from Rohm & Haas Co.

Some non-limiting examples of colorants include organic dyes or inorganic pigments or lightness inducing agents.

Some non-limiting examples of resins include alkali soluble resins, styrene maleic anhydride copolymers, rosin esters, and acrylic oligomers.

A variety of film formers can be employed in the invention, including solvent-borne, waterborne or 100% solids compositions containing monomers, oligomers or polymers and employing a variety of hardening systems. Exemplary film formers include water-soluble or water dispersible (as is or with a dispersing agent) acid-containing polymers crosslinked using transition metals, alkaline earth metals, alkali metals or mixtures thereof (e.g., zinc crosslinked acrylics); zinc-free acrylic finishes (e.g., acrylic copolymers); polyurethanes (e.g., radiation-curable polyurethanes, polyurethane dispersions, multipart polyurethanes and latent one part polyurethane compositions containing a blocked isocyanate); acrylic urethanes; water-based (e.g., waterborne) latex emulsions; wax emulsions; hydroxy containing polyacrylates; and a variety of other materials that will be familiar to those skilled in the art. Representative commercially available film formers include DURAPLUS™ 3 zinc crosslinked acrylic dispersion, DURAPLUS 2 zinc crosslinked acrylic dispersion, RHOPLEX B-924 zinc crosslinked acrylic dispersion, RHOPLEX NT-2624 acrylic dispersion, DURA-GREEN acrylic dispersion, RHOPLEX NTS-2923 acrylic dispersion, RHOPLEX 3949 acrylic dispersion, RHOPLEX™ 1421 zinc crosslinked acrylic dispersion, RHOPLEX 3830 zinc crosslinked acrylic dispersion, and UHS PLUS zinc crosslinked acrylic dispersion from Rohm & Haas Co.; MEGATRAN™ 205 zinc crosslinked acrylic dispersion and SYNTRAN™ 1580 zinc crosslinked acrylic dispersion from Interpolymer Corp.; MORGLO™ zinc crosslinked acrylic dispersion, ML-870 zinc crosslinked acrylic dispersion and ML-877 zinc crosslinked acrylic dispersion from Omnova Solutions Inc.; 98-283W urethane acrylate from Hans Rahn & Co.; and materials such as those described in U.S. Pat. Nos. 4,517,330, 4,999,216, 5,091,211, 5,319,018, 5,453, 451, 5,773,487, 5,830,937, 6,096,383, 6,197,844, 6,228,433. 6,316,535 B1, 6,544,942 B1, U.S. Patent Application Publication No. U.S. 2002/0028621 A1, and in the patents cited therein. Especially preferred film formers include water-soluble or water-dispersible film formers such as acid-containing polymers crosslinked using transition metals, and water-soluble or water-dispersible multicomponent (e.g., two component) polyurethanes. Mixtures of film formers can also be employed.

The coating system may also contain water or another suitable diluent, plasticizer or coalescent, including compounds such as benzyloxyethanol; an ether or hydroxyether such as ethylene glycol phenyl ether (commercially available as "DOWANOL EPh" from Dow Chemical Co.) or propylene glycol phenyl ether (commercially available as "DOWANOL PPh" from Dow Chemical Co.); tributoxyl ethyl phosphate (commercially available as AMGARD TPEP from Albright & Wilson), ester alcohols (commercially available as Texanol and TXIB from Eastman), benzoate esters (commercially available as Benzoflex from Velsicol), citric acid esters, dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products available under the trade designations DBE, DBE-3, DBE-4, DBE-5, DBE-6, DBE-9, DBE-IB, and DBE-ME from DuPont Nylon); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate; and mixtures thereof. Cosolvents can also be added if desired to assist in formulating and applying the finish. Suitable cosolvents include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp.;

and mixtures thereof. The concentration may vary depending in part on the other finish ingredients and on the intended application and application conditions. As a general guide, when water alone is used as a diluent, the water concentration preferably is from about 15 to about 98 wt. % based on the finish formulation weight. More preferably, the finish contains about 25 to about 95 wt. % water, and most preferably about 60 to about 95 wt. % water. If a diluent, plasticizer, coalescent or cosolvent other than water is included in the finish formulation, then its concentration preferably is from about 0.1 to about 30 wt. % based on the weight of polymerizable solids in the finish, and more preferably about 1 to about 20 wt. %.

The coating system may contain additional initiators, catalysts or crosslinkers capable of hardening the film former. For example, depending in part on the chosen film former, the coating system may contain transition metal compounds such as zinc or zirconium compounds; tin compounds such as dibutyl tin dilaurate, stannous octoate and FASCAT™ 4224 dibutyltin bis(1-thioglycerol) catalyst (commercially available from ATOFINA Chemicals, Inc.); amines; other zinc compounds such as zinc crosslinked acrylic dispersions, ultrafine zinc oxide and zinc carbonates including zinc tetraamine carbonate and zinc ammonium carbonate; and a variety of other materials that will be familiar to those skilled in the art. The hardening mechanism can be thermal such as ambient curing or elevated temperature curing, ultraviolet curing, or radiation curing.

The coating system may also contain inorganic or organic particles (or both inorganic and organic particles) to enhance its abrasion resistance, scratch resistance, wear resistance, appearance, or strippability. Preferred inorganic particles are described in U.S. patent application Ser. No. 09/657,420 filed Sep. 8, 2000 and entitled SCRATCH-RESISTANT STRIPPABLE FINISH, the disclosure of which is incorporated herein by reference. It should be noted that the inorganic particles in the UV-curable finishes exemplified in the latter reference did not diffusely reflect light. In addition, the coating system may include lightness inducing agents such as those described in U.S. patent application Ser. No. 11/033,029 filed Jan. 11, 2005 and entitled FLOOR FINISH COMPOSITION, LAMINATES, AND METHODS FOR TREATING FLOORS, the disclosure of which is incorporated herein by reference.

The stated film-forming polymer is preferably selected from polyurethanes and/or polycarboxylates, in particular from polyacrylates.

It is preferred, moreover, that a) is to be understood to comprise several agents, one of which is free of aziridine and contains a polymer or polymer/wax dispersion and is identical with the formulation of agent b).

For the system according to the invention it is likewise preferred that one or more of the agents a) and/or b) contain surfactants, the total content of surfactants amounting, relative to the respective agent a) and/or b), preferably to 0.01 to 35 wt. %, particularly preferably 0.01 to 10 wt. %. The expression 'total content' is to be understood as relating only to one of the surfactant-containing agents and not to the sum of all the agents that are present in accordance with the invention.

The surfactants are very particularly preferably selected from non-ionic surfactants, in particular from alkyl polyglucosides, and from anionic surfactants, in particular from the group comprising the alkyl sulfates, alkyl sulfonates, olefin sulfonates, ether sulfates, soaps, fluorinated surfactants, silicone surfactants and mixtures thereof.

In one embodiment, the base film can be made by adding aziridine to a known floor finish composition. Some non-limiting examples of known floor finish compositions include PADLOCK™, GEMSTAR LASER™ MARKETSTAR, STRATUS, and TAJ MAHAL™ acrylic floor finishes and COURTMASTER II™ urethane floor finish from Ecolab Inc.; CORNERSTONE™ and TOPLINE™ acrylic floor finishes from 3M; BETCO BEST™ floor finish from Betco Corp.; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; OVER AND UNDER™ floor sealer from S.C. Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; ACRYL-KOTE™ Seal and Finish and PREP Floor Seal from Minuteman, International, Inc.; ULTRA TC™ and UV I-FINISH™ UV-curable finishes from Minuteman, International, Inc; FLOORSTAR™ Premium 25 floor finish from ServiceMaster, Inc.; and UPPER LIMITS™ acrylic finish and ISHINE™ optically brightened floor finish from Spartan Chemical Co. Other suitable formulations that can be combined with the pigment include No. AD200C 1 polyester polyurethane formulation from Air Products and Chemicals, Inc.; No. MG98-040 polyester polyurethane formulation from Bayer AG; STAY-CLAD™ 5900 hydroxyl-functional acrylic polymer dispersion from Reichhold, Inc.; Nos. 979-1 and 980-3 polyester polyurethane formulations from U.S. Polymers, Inc.; and No. G-2029 acrylic polyurethane formulation from Zeneca Resins.

The present invention further provides a process for the treatment of coating systems that are present in accordance with the invention with cleaning agents and/or disinfecting agents containing one or more antimicrobial components selected from the group comprising the alcohols, aldehydes, antimicrobial acids, carboxylic esters, acid amides, phenols, phenol derivatives, diphenyls, diphenyl alkanes, urea derivatives, oxygen acetals, nitrogen acetals, oxygen formals, nitrogen formals, benzamidines, isothiazolines, phthalimide derivatives, pyridine derivatives, antimicrobial surface-active compounds, quaternary ammonium compounds, antimicrobial alkylamines, guanidines, antimicrobial amphoteric compounds, quinolines, 1,2-dibromo-2,4-dicyanobutane, iodo-2-propinylbutyl carbamate, iodine, iodophors, fatty acids such as octanoic acid, peroxides and peracids such as peracetic and peroctanoic acid.

In this connection it is particularly preferred if the cleaning agents and/or disinfecting agents contain one or more antimicrobial components selected from the group comprising the quaternary ammonium compounds, alkylamines and Glucoprotamin® and in particular if the stated antimicrobial components are selected from the group comprising the alkyl propylenediamines having the general formula I

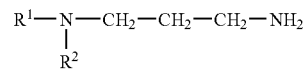

in which R1 signifies an alkyl or alkenyl group with 8 to 18 carbon atoms and R2 signifies hydrogen, an alkyl group with 1 to 4 carbon atoms or an aminoalkyl group with 2 to 4 carbon atoms, and the products known as Glucoprotamin®, such as are available from alkyl propylenediamine of the formula II in which R3 stands for a linear alkyl group with 12 to 14 carbon atoms, by conversion with compounds of the formula III

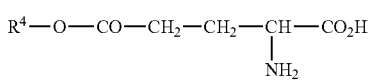

in which R4 stands for hydrogen or an alkyl group with 1 to 4 carbon atoms, in a molar ratio of 1:1 to 1:2 at 60 to 175° C.

It is still more preferred if the stated antimicrobial components are selected from Glucoprotamin®, N,N-bis(3-aminopropyl)laurylamine, N-dodecyl-1,3-propanediamine, N-coco-1,3-propanediamine or a mixture of these, whereby in the special case the stated antimicrobial component is Glucoprotamin®.

By virtue of the process according to the invention it is preferably ensured that the extent of yellowing and/or staining is diminished in comparison with the extent occurring in the case of conventional coating systems with a sacrificial layer that is capable of being removed by wet chemical means. In the following, the invention summarises the visually recognisable changes to the surface which occur, such as yellowing and/or staining, generally under the term 'discolorations'.

The present invention further provides a process for coating floors, in which, in one process step, a base film containing aziridine-crosslinked polymers, where desired intermixed with flatting components, is applied, and, after drying, a sacrificial film containing conventional maintenance components for floors, in particular a polymer or polymer/wax dispersion, is applied directly onto the stated base film in a further step. In this connection the subject-matter is to be understood in such a way that it is entirely possible for yet other coatings to be applied beneath the base film. The essential point in the sense of the present invention is that the film serving as basis for the sacrificial film or maintenance film that is not crosslinked with aziridine is to be understood as being the base film.

In the process according to the invention it is preferred that
i) prior to application of the stated base film the agents that are present in conformity with the system according to the invention have been decanted in casks, the volume of which is so chosen that when the complete contents of the casks are intermixed a mixture is present that exhibits precisely the ratio of the essential components in conformity with the system according to the invention that is desired for the formation of the base film, and
ii) the agents are prepared by bringing together and intermixing the entire contents of the stated casks for the application of the stated base film.

In this connection the bringing-together and intermixing of the entire contents of the stated casks are preferably carried out in one of the stated casks, particularly preferably in that cask in which the largest agent by volume is located.

If a) is to be understood to comprise several agents, one of which is, in accordance with the invention, identical with b), there is preferably the possibility of dispensing with one cask. In this case, for the base coating a first portion of the agent b) that is identical with a) would be intermixed with the additional agents a), namely the agents containing aziridine and/or, where desired, flatting components, and applied. After drying of the base film, the remaining portion of the agent b) that is identical with a) could then be applied partially or wholly by way of sacrificial layer.

The present invention also provides a floor coating in which a sacrificial film containing conventional maintenance components for floors and, preferably, antimicrobial components is applied directly onto a base film containing aziridine-crosslinked polymers and, where desired, a flatting component.

The disclosed coating system can be applied to a variety of substrates, including wood, plastics, metals, concrete, wallboard and other mechanical or architectural substrates. The disclosed finishes are particularly well-suited for application to flooring substrates due to their clean appearance. Representative flooring substrates include resilient substrates such as sheet goods (e.g., vinyl flooring, linoleum or rubber sheeting), vinyl composite tiles, rubber tiles, cork and synthetic sports floors, and non-resilient substrates such as concrete, stone, marble, wood, ceramic tile, grout, Terrazzo and other poured or "dry shake" floors. The coating can be jobsite-applied to a flooring substrate after the substrate has been installed (e.g., to monolithic flooring substrates such as sheet vinyl goods, linoleum, cork, rubber sheeting, synthetic sports floors, concrete, stone, marble, grout or Terrazzo, or to multipiece flooring substrates such as vinyl composite tiles, wood floorboards or ceramic tiles), or can be factory-applied to a flooring substrate before it is installed (e.g., to monolithic flooring substrates such as sheet vinyl goods in roll form, or multipiece flooring substrates such as vinyl composite tiles or wood floorboards). Jobsite application is especially preferred, with suitable jobsites including indoor and outdoor sites involving new or existing residential, commercial and government- or agency-owned facilities.

The disclosed coating system can be applied using a variety of methods, including spraying, brushing, flat or string mopping, roll coating and flood coating. Mop application, especially flat mopping, is preferred for coating most floors. Suitable mops include those described in U.S. Pat. Nos. 5,315,734, 5,390,390, 5,680,667 and 5,887,311. Typically, the floor should first be cleaned and any loose debris removed. One or more undercoat layers or coats (diluted if necessary with water or another suitable diluent, plasticizer, coalescent or cosolvent) may be applied to the floor. One to three undercoat layers typically will be preferred. When multiple undercoat layers are employed they can be the same or different. Each undercoat layer preferably will have a dry coating thickness of about 2.5 to about 25 microns, more preferably about 2.5 to about 15 microns. Preferably the overall undercoat dry coating thickness will be about 5 to about 100 .mu.m, and more preferably about 5 to about 50 .mu.m.

EXAMPLES

In several series of tests the influence on the appearance of various coating systems was investigated in the case of regular treatment with disinfectant solutions.

TABLE 1

| Ingredients of the coating formulations [in wt. %] | | | |
|---|---|---|---|
| Ingredient | B1 | B2 | B3 |
| Zn-crosslinked polyacrylate | — | 20 | — |
| Non-crosslinked polyacrylate | 18 | — | — |
| Aziridine-crosslinked polyacrylate | — | — | 19 |
| Wax dispersion based on polyethylene/polypropylene | 3 | 3 | 3 |

TABLE 1-continued

Ingredients of the coating formulations [in wt. %]

| Ingredient | B1 | B2 | B3 |
|---|---|---|---|
| Polyurethane dispersion | 2 | 2 | 2 |
| Non-ionic surfactant: fatty alcohol with 6–7 EO groups | 2 | 2 | 2 |

Remainder to 100 wt. %: water and additional conventional substances* for floor-coating agents
*for example, permanent plasticizers (optionally tributoxyethyl phosphate), temporary plasticizers (such as ethyl diglycol), flow promoters (such as non-ionic surfactants or other wetting agents)

The various floor-coating systems to be tested were produced using the floor-coating formulations B1 to B3 according to Table 1. For the purpose of producing the floor-coating systems, the floor-coating formulations B1 to B3 were evenly distributed, by themselves or above one another, in quantities of, in each case, 10 ml with the aid of a manual application instrument on PVC sheets with a size of 30 cm×60 cm. In the case where several coatings were applied above one another, care was taken prior to application of the additional coating to ensure that the coating film already present had sufficient time for drying. The coating systems that were prepared in this way are compiled in Table 2.

TABLE 2

Coating systems for implementation of the tests

| Coating system | Type of coating |
|---|---|
| V1 | Only one coating film: B1 |
| V2 | Only one coating film: B2 |
| V3 | Three coating films B1 |
| V4 | Two coating films: B1; above it one coating film: B2 |
| V5 | Three coating films: B2 |
| V6 | Only one coating film: B3 |
| E1 | Two coating films: B3; above it one coating film: B2 |

The PVC sheets which were coated with the respective floor-coating formulations were prepared in duplicate and stored at 40° C. in a darkroom.

A first series of the test objects which had been stored in this way was wiped in the darkroom three times a day at approximately two-hourly intervals with a surface-disinfectant solution in which, by way of antimicrobial component, Glucoprotamin® was present in a concentration of 0.25 wt. % relative to the entire solution.

A second series of the test objects which had been stored in this way was wiped in the darkroom three times a day at approximately two-hourly intervals with a surface-disinfectant solution in which, by way of antimicrobial components, dimethylalkyl(C12-14)benzylammonium chloride (benzalkon) in a concentration of 0.15 wt. % and polyhexamethylene biguanide in a concentration of 0.05 wt. % were present, relative to the entire solution.

After 70 days the test objects were withdrawn from the darkroom and the yellowing was evaluated visually by trained specialist staff.

In this connection the scale of evaluation extended from −5 (=very strong discoloration) to 0 (no discoloration of any kind).

The results can be gathered from Table 3.

TABLE 3

Evaluation of the discoloration of the coating systems from Table 2 after 70 days of storage in the darkroom at 40° C. and regular treatment with disinfectant solutions

| Coating system | Discoloration after treatment with Glucoprotamin ® solution | Discoloration after treatment with benzalkon/biguanide solution |
|---|---|---|
| V1 | −5 | −4 |
| V2 | −5 | −5 |
| V3 | −5 | −4 |
| V4 | −5 | −4 |
| V5 | −5 | −5 |
| V6 | 0 | 0 |
| E1 | −1 | −1 |

In the course of the tests it became evident that the aziridine-crosslinked coating film was not susceptible to the conditions obtaining in the test and did not result in discoloration of any kind.

Totally surprising, however, was the fact that in the case of example E1 according to the invention the susceptibility of the outer coating (sacrificial layer) to discoloration was so slight. This could not be expected, since, as was shown in the remaining tests, the sacrificial layer that was present in the case of E1 had a strong tendency towards discoloration under the chosen conditions. The fact that one or more aziridine-crosslinked coating films (base layer) is/are present directly beneath the sacrificial layer could not lead to the assumption that the susceptibility of the sacrificial layer was thereby reduced.

What is claimed is:

1. A coating composition for floors comprising:
    a) a polymer dispersion comprising:
        i, aziridine, and
        ii, a polymer selected from the group consisting of polyurethanes, polycarboxylates, polyacrylates, and mixtures thereof;
    wherein the polymer and the aziridine form a crosslinked base film that is incapable of being substantially removed by wet chemical means; and
    b) an aziridine-free polymer dispersion comprising a polymer selected from the group consisting of polyurethanes, polycarboxylates, polyacrylates, and mixtures thereof, wherein the aziridine-free polymer dispersion is crosslinked and wherein the aziridine-free polymer dispersion is capable of being substantially removed by wet chemical means.

2. The composition of claim 1, wherein the polymer dispersion and the aziridine free polymer dispersion are packaged separately.

3. The composition of claim 1, wherein the polymer dispersion is packaged in a first container, and the aziridine-free polymer dispersion is packaged in a second container, such that when the first and second containers are mixed to form the coating composition, the composition exhibits the ratio of the polymer dispersion, and the aziridine-free polymer dispersion that is desired for the coating composition.

4. The composition of claim 3, wherein the volume of the first or second container is sufficiently large enough to accommodate the contents of both the first and second containers.

5. The composition of claim 1, wherein the composition further comprises conventional floor-maintenance components selected from the group consisting of waxes, surfactants, film-forming polymers, diluent, solvents, surface slip modifiers, defoamers, indicators, UV absorbers, light stabilizers, antioxidants, plasticizers, coalescents, adhesion promoters, film-forming polymers, inorganic particles, organic particles, preservatives or antimicrobials, levelling agents, thickeners, dispersants, stability enhancers, and mixtures thereof.

6. The composition of claim 5, wherein the surfactant is present from about 0.01 to about 35 wt. %.

7. The composition of claim 5, wherein the surfactant is present from about 0.01 to about 10 wt. %.

8. The composition of claim 1, wherein the polymer dispersion and the aziridine free polymer dispersion are identical composition except that the polymer dispersion also contains aziridine.

9. The composition of claim 1, wherein the polymer dispersion and the aziridine free polymer dispersion are different compositions besides the addition of aziridine to the polymer dispersion.

* * * * *